United States Patent
Kandler et al.

(10) Patent No.: US 7,225,678 B2
(45) Date of Patent: Jun. 5, 2007

(54) HOUSING STRUCTURE OF A PRESSURE SENSOR APPARATUS AND METHOD OF PRODUCING THE SAME

(75) Inventors: Michael Kandler, Munich (DE); Alfred Niklas, Poing (DE)

(73) Assignee: Infineon Technologies AG, Munich (DE)

( * ) Notice: Subject to any disclaimer, the term of this patent is extended or adjusted under 35 U.S.C. 154(b) by 0 days.

(21) Appl. No.: 11/226,731

(22) Filed: Sep. 14, 2005

(65) Prior Publication Data
US 2006/0053895 A1    Mar. 16, 2006

(30) Foreign Application Priority Data
Sep. 16, 2004   (DE)   .................. 10 2004 044 982

(51) Int. Cl.
*G01L 7/08* (2006.01)
(52) U.S. Cl. .......................................... 73/715; 73/753
(58) Field of Classification Search .......... 73/700–756; 361/283.1–283.4
See application file for complete search history.

(56) References Cited

U.S. PATENT DOCUMENTS

| 4,842,685 | A | | 6/1989 | Adams ..................... 156/308.2 |
|---|---|---|---|---|
| 4,993,265 | A | * | 2/1991 | Koen et al. ................... 73/706 |
| 5,335,549 | A | * | 8/1994 | Kato ........................... 73/706 |
| 5,461,922 | A | * | 10/1995 | Koen .......................... 73/756 |
| 5,661,245 | A | * | 8/1997 | Svoboda et al. .............. 73/726 |
| 5,874,679 | A | | 2/1999 | Sokn .......................... 73/706 |
| 6,047,604 | A | * | 4/2000 | Auburger et al. ............. 73/756 |
| 6,214,634 | B1 | | 4/2001 | Osajda et al. ................. 438/50 |
| 6,311,561 | B1 | * | 11/2001 | Bang et al. ................... 73/708 |
| 7,021,148 | B2 | * | 4/2006 | Kuhn et al. ................... 73/715 |
| 2004/0118214 | A1 | * | 6/2004 | McDonald et al. ........... 73/756 |

\* cited by examiner

*Primary Examiner*—Edward Lefkowitz
*Assistant Examiner*—Jermaine Jenkins
(74) *Attorney, Agent, or Firm*—Baker Botts L.L.P.

(57) ABSTRACT

A pressure sensor apparatus includes a reception container for receiving a pressure sensor, the reception container having an opening on one side. Furthermore, the pressure sensor apparatus includes a protective membrane closing the opening, a pressure sensor arranged in the reception container, and a gel arranged between the pressure sensor and the protective membrane.

24 Claims, 2 Drawing Sheets

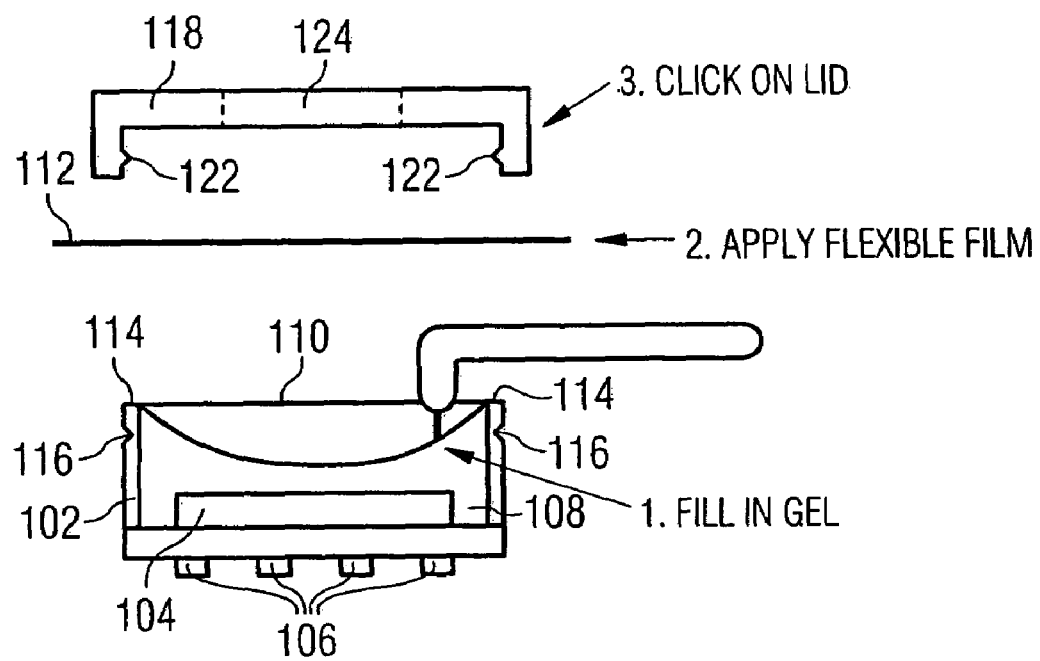

HOUSING STRUCTURE OF A PRESSURE SENSOR APPARATUS AND METHOD OF PRODUCING THE SAME

CROSS-REFERENCE TO RELATED APPLICATIONS

This application claims priority from German Patent Application No. 10 2004 044 982.1-33, which was filed on Sep. 16, 2004, and is incorporated herein by reference in its entirety.

TECHNICAL FIELD

The present invention concerns the technological field of semiconductor sensor technology, and in particular the present invention concerns a housing structure for a semiconductor pressure sensor.

BACKGROUND

In surface micromechanical pressure sensors, an active, i.e. sensitive, chip side is exposed to a medium the pressure of which is to be measured. Moisture present in the medium as well as aggressive constituents, such as acids, lyes, oxidizing media, salts, and organic solvents, may attack the chip surface and render the sensor completely or partly non-functional. This is a problem especially in the automobile area, where such sensors have to function within tight tolerance boundaries for years.

Existing solutions count on the protection of the sensor surface by a combination of normal chip passivation (e.g. silicon nitride) and mechanical protection of a low-viscous gel. But since the gel is permeable for gasses and partly also for ions, this solution has disadvantages. Humidity may diffuse through the gel in unhindered manner. If there are places of bad adhesion or contaminations between gel and chip surface, moisture may condense there and lead to surface currents or to a change of the dielectric constant. Particularly in voids in the passivation, this may lead to complete failure of the device. A further problem is the solubility of gasses in the gel. At pressure release, this leads to a sudden formation of bubbles in the gel (sparkling effect). By these bubbles, the gel may tear open and the protective function is lost. Moreover, offset errors may arise in the pressure signal. There is not yet a satisfactory solution for the bubble formation at pressure changes. This problem of bubble formation in gels, however, only occurs in applications with pressures greater than 3 bar (e.g. in the tire pressure measurement). Furthermore, gel is not environment-resistant, for example with reference to organic solvents such as gasoline, whereby the gel then dissolves for example on contact with such organic solvents. A pressure sensor or protection of a pressure sensor using gel can thus, under certain circumstances, not be used in the automotive industry, since pressure sensors to be applied in the automobile area have to withstand extreme environmental conditions. Among these extreme environmental conditions are for example high temperature variations (e.g. of a variation range of about 80° C. between summer and winter) as well as compatibility with substances acting organically as solvents, such as gasoline or similar fuels.

Another existing solution for the protection of the active chip side or the sensor surface, which obviates the above-mentioned problems, is the use of a housing with a metal membrane and an oil filling. The flexibility of the metal membrane is achieved by embossed, concentric grooves. This solution, however, is technically intensive and expensive and therefore not suited for mass production. In particular, this results from such an oil-filled pressure sensor container having to be produced from a special material (such as stainless steel), in order to prevent deformation of the container at temperature-induced expansion of the oil and thus possible arising leakage of such an oil-filled pressure sensor housing. Moreover, an oil-adapted membrane for balancing the (e.g. temperature-induced) oil pressure change and thus for compensating for possible offset-bearing measurement results has to be welded onto the oil-filled housing in a first weld with the housing. Furthermore, the oil has to be filled in a state in which the housing is already provided with the membrane, and the (stainless steel) housing has to comprise special capillary roles to enable the oil to be filled in the housing uniformly and without air inclusions. Furthermore, this requires evacuating the housing to again minimize the probability of air inclusions occurring in the oil filling, since such air inclusions in the oil lead to flawed pressure transfer between the membrane and the pressure sensor due to the compressibility of gasses. Furthermore, the housing has to be welded a second time when the oil has been filled in, whereby such an oil-filled pressure sensor housing proves cost-intensive due to the materials to be used and the production steps necessary for fabrication (with two weld connections).

SUMMARY

Starting from this prior art, it is an object of the present invention to provide a pressure sensor apparatus and a method of producing the same in an inexpensive and simple manner, which offer a possibility to protect a sensitive pressure sensor face permanently from chemical or mechanical attack, but to enable undamped access of the pressure changes to the pressure sensor or the sensitive pressure sensor face at the same time. Furthermore, it should also be possible to prevent the problem of tearing open of the gel, e.g. at bubble formation in the gel.

In accordance with a first aspect, the present invention provides a pressure sensor apparatus, having: a reception container for receiving a pressure sensor, the reception container having an opening on one side; a protective membrane closing the opening; a pressure sensor arranged in the reception container; a gel arranged in the reception container between the pressure sensor and the protective membrane.

In accordance with a second aspect, the present invention provides a method of producing a pressure sensor apparatus, having the steps of: providing a reception container and a pressure sensor arranged in the reception container, the reception container having an opening; filling in gel into the reception container; and applying a protective membrane onto a surface of the gel in the area of the opening of the reception container in order to close the opening of the reception container, such that the gel is arranged between the protective membrane and the pressure sensor.

The present invention is based on the finding that by the use of a reception container, which on one side has an opening, a protective membrane closing the opening, a pressure sensor arranged in the reception container, and a gel arranged in the reception container between the pressure sensor and the protective membrane, protection of the gel against mechanical or chemical attacks is possible. Furthermore, by the use of gel which is not compressible, deformable, but hard enough to transfer pressure from the protective membrane to the pressure sensor, pressure transfer from the protective membrane to the pressure sensor may be enabled in technically simple manner. Furthermore, by applying the protective membrane, the sparkling effect mentioned in the gel is prevented, because the applied protective membrane increases resistance at the surface of the gel against tearing open.

The present invention offers the advantage of a pressure sensor apparatus, which is inexpensive and simple to manufacture, since, by the use of gel, such as silicone gel, a technically easy-to-perform fabrication is possible. Furthermore, the use of gel offers the advantage of a use of an inexpensive reception container, which may for example be fabricated of plastic material, since, as compared with an oil-filled pressure sensor housing, no expansion of gel at temperature variations is to be taken into account. Furthermore, by the use of a protective membrane in form of plastic film or foil, which is inexpensive to produce, protection of the gel against mechanical and chemical attacks may be guaranteed. No intensive structuring of the film is necessary to ensure a flexibility of the film, as this is necessary for example in the steel membrane with the concentric grooves. In particular, the film may consist of chemically inert materials, such as Teflon (i.e. PTFE=poly tetra fluor ethylene), polyethylene, or polypropylene, with these plastics being broadly available and thus inexpensively available due to their employment as packaging material of consumer products. Moreover, by the use of the chemically inert plastic protective membrane, the gel and the pressure sensor may be protected from solvents, such as gasoline or acids, whereby the field of application of such a pressure sensor apparatus may most favorably be expanded to the motor vehicle area. As a further advantage of the inventive pressure sensor apparatus, it can be mentioned that the production of such a pressure sensor apparatus is simple as opposed to conventional pressure sensor apparatus. In particular as compared to an oil-filled pressure sensor housing, significant simplification of the production of the said pressure sensor apparatus may be achieved, since, in particular, no intensive filling of the housing with oil and ensuing welding for sealing the oil container is necessary, whereupon again welding the applied metal membrane has to take place.

Preferably, the protective membrane covers the gel in a bubble-free manner, which offers an improvement of the pressure transfer from the protective membrane to the pressure sensor.

According to one embodiment of the present invention, the protective membrane is fluid-impermeable. This offers the advantage that escape of gasses from the gel or penetration of humidity or liquids into the gel is prevented.

It is favorable if a connection between the protective membrane and the reception container is fluid-impermeable, since in this case also penetration of humidity or liquids into the gel or escape of gasses from the gel is prevented also via the area between protective membrane and the reception container.

Furthermore, the protective membrane may be ion-impermeable, which has the advantage that also a change in the electric properties around the pressure sensor, i.e. in the gel, may be kept constant.

It is particularly advantageous if the protective membrane is unstructured, because this leads to simple and inexpensive production of the protective membrane.

In an inexpensive embodiment, it is provided that the reception container include plastic material.

Furthermore, in a further inexpensive embodiment, the gel of the pressure sensor apparatus may be silicone gel, which is broadly available and thus inexpensive to obtain.

It is of advantage if the protective membrane comprises a plastic material, since a pressure sensor apparatus produced in such manner may then be produced in simple and inexpensive manner again by the broad availability of plastic films.

Alternatively, the protective membrane may also include a metal material. In particular, this offers the advantage that the pressure sensor apparatus may be employed in a field of application in which plastic films as membrane could not be used.

It is preferred if the plastic material is a Teflon, polyethylene, or polypropylene, since these materials are widely common and thus can be produced industrially and can therefore also be obtained inexpensively.

Preferably, the pressure sensor apparatus comprises a protective lid by which the protective membrane is at least partly covered. This offers further protection of the gel against mechanical (or chemical) attacks.

In particular, the protective lid may comprise a lid opening by which the protective membrane is at least partly exposed. This offers the advantage that the chemical or mechanical attacks on the protective membrane are restricted to the exposed partial area of the protective membrane, but at the same time pressure transfer between the protective membrane (or the exposed partial area of the protective membrane) and the pressure sensor is possible.

It is favorable if the protective lid is mounted to the reception container by means of a latch connection, with the latch connection including a groove and a lug latchable in the groove, because such a latch connection offers an inexpensively producible way of mounting the protective lid with the reception container.

Preferably, the reception container and the protective lid may comprise a cylindrical shape, whereby tight closure of the reception container with the protective lid is facilitated.

In particular, the lid opening may comprise a circle shape, which facilitates producing such a lid opening for example by a step of drilling as opposed to milling, whereby further cost savings in the production of the pressure sensor apparatus are possible. Furthermore, the lid opening may also comprise an oval shape or a rectangular shape, whereby then a larger area of the protective membrane may be exposed than with a circular lid opening and thus a greater area is available for the pressure transfer between protective membrane and pressure sensor for external pressure influences.

In order to provide further simplification of the production of a tight connection between the protective membrane and the reception container, the latch connection may be caused by a groove and an associated lug, with the groove being arranged either in the protective lid or the reception container and the lug being arranged in the other of the protective lid and the reception container, and with the protective membrane being clamped at least partly between the groove and the lug. This enables high flexibility in the production of the reception container and the protective lid and correspondingly a latch connection, which favorably can be employed depending on the field of application.

It is favorable if the protective membrane is clamped between the lug and the groove along a complete circumference, in order to serve as sealing means for the latch connection, whereby the same is fluid-impermeable. This offers the advantage of an easy-to-produce seal between the protective membrane and the gel, which thus has a further cost-reducing effect on the production costs of such a pressure sensor apparatus.

In order to produce a tight connection between the protective membrane and the reception container when using a not self-sealing protective membrane (such as a metal film), the connection between the protective membrane and the reception container may be a weld connection.

Furthermore, the connection between the protective membrane and the reception container also may include a glue connection, which can easily be realized in terms of production, particularly when the membrane material is can be welded only with greater technical effort.

In order to ensure or optimize tightness of the connection between the reception container and the protective membrane, also a combination of a connection by the latch connection, a weld connection, or/and a glue connection between the protective membrane and the reception container may be used.

According to a favorable embodiment, in the method of producing a pressure sensor apparatus, applying the protective membrane may be performed such that the protective membrane covers the surface of the gel in a bubble-free manner. This offers the advantage that a pressure sensor apparatus produced in such manner offers improved pressure transfer of a pressure from the protective membrane to the pressure sensor.

Furthermore, in the method of producing a pressure sensor apparatus, the step of applying may be performed after the step of filling in, which has the advantage of simpler and quicker production of such a pressure sensor apparatus.

An embodiment of the method of producing a pressure sensor apparatus is particularly favorable, wherein the step of applying comprises the steps of:
- arranging the protective membrane above the opening of the reception container;
- centrally fitting the protective membrane over the surface of the gel using a convex-shaped stamping tool; and
- completely pressing the protective membrane to the surface of the gel up to an edge of the opening of the reception container.

Such an embodiment offers the advantage of simply and securely applying the protective membrane onto the gel, without causing bubble formation, whereby the security of flawless pressure transfer from the protective membrane to the pressure sensor can be increased due to the absence of bubbles caused by the application by means of the stamping tool.

BRIEF DESCRIPTION OF THE DRAWINGS

These and other objects and features of the present invention will become clear from the following description taken in conjunction with the accompanying drawings, in which:

FIG. 2 is an embodiment of steps of the inventive method of producing a pressure sensor apparatus.

DETAILED DESCRIPTION

Figure 1A:
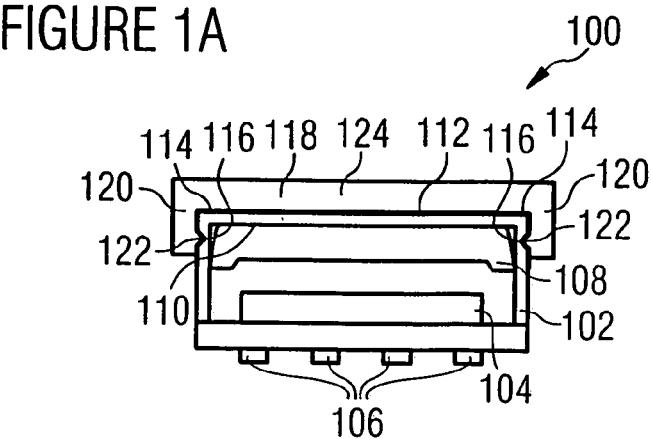
FIG. 1A is a cross-sectional illustration of a first embodiment of the present invention.

In the subsequent figures, the same or similarly acting elements are provided with the same or similar reference numerals, wherein repeated description of these elements is omitted.

FIG. 1A shows a cross-sectional illustration of an embodiment of the inventive pressure sensor apparatus. The pressure sensor apparatus 100 here includes a reception container 102, which may preferably be fabricated from plastic material. The material of the reception container 102, however, may also be metal material. In the reception container 102, a pressure sensor 104 is arranged, which is for example a semiconductor chip and which is connected, for example via a connection illustrated in greater detail in the following, to contact pads 106 arranged at a bottom of the reception container 102. Furthermore, in the reception container, a gel 108 is arranged, which surrounds the pressure sensor 104.

At an opening 110 of the reception container, a film 112 is applied onto the gel 108, so that the gel 108 is in contact with the film 112 on the whole surface and the film 112 thus covers the gel 108 on the whole surface and thus no air inclusions between gel 108 and film 112 remain. At an edge 114, a gas and liquid-impermeable connection between the film 112 and the reception container 102 is formed. This connection may also be formed at an upper edge 114 of the reception container 102 or at an outside of the reception container 102. This liquid and gas-impermeable connection (=fluid-impermeable connection) may for example be a glue connection or a weld. Alternatively, however, also an easy-to-arrange clip connection may be used, as it is for example illustrated in FIG. 1A. To this end, the reception container 102 may comprise, on the outside in the area of the opening 110, a groove 116 across which the film 112 extends. Over this groove 116 and the film 112 extending across the groove 116, a protective lid 118 is arranged, which has a side wing 120 comprising a corresponding lug 122 in the area of the groove 116 in the reception container, so that the lug 122 of the protective lid 118 results in a latch connection with the groove 116 of the reception container 102. Through the film 112 arranged between the lug 122 of the protective lid 118 and the groove 116 of the reception container 102, thus a fluid-impermeable connection and thus a seal between the film 112 and the gel 108 may be provided. Furthermore, in the protective lid 118, an opening 124 is arranged, through which a partial area of the film 112 is exposed. By using the protective lid 118, which for example also consists of a plastic material (such as Teflon, polyethylene or polypropylene), further protection of the film 112 may be achieved, since only a small partial area of the film 112 is exposed and thus only the small partial area is exposed to the mechanical or chemical attacks. The use of such a protective lid 118 may thus contribute to an increase in the life of such a pressure sensor apparatus 100.

Figure 1B:
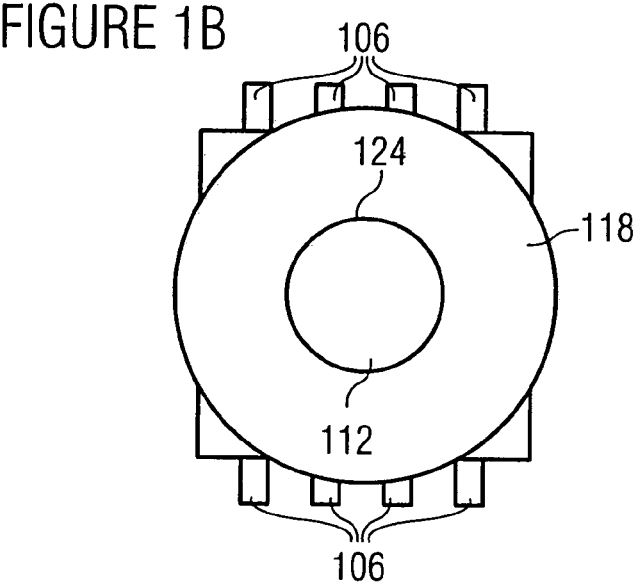
FIG. 1B is a plan view of the first embodiment of the present invention illustrated in FIG. 1A.

FIG. 1B shows a plan view of the pressure sensor apparatus 100 illustrated in FIG. 1A. Here, it is apparent that the protective lid 118 may comprise a circular-symmetric or cylinder shape, whereby then preferably also the reception container 102 should comprise a circular or cylinder-symmetric shape. Such a circular or cylinder-symmetric shape has the advantage that, when using the latch connection with the lug 122 and the groove 116 illustrated in FIG. 1A, uniform pressure is exerted at all parts of the latch connection and thus damage of the film 112 introduced between the lug 122 and the groove 116 is avoided. At the same time, a uniform connection also comprises greater protection against spilling of gel, since there are no pronounced weak spots in the fluid-impermeable connection. Alternatively, reception container 102 and a protective lid 118 corresponding hereto may also have another shape, e.g. a rectangular or square shape. This may for example be advantageous by correspondingly inexpensive production.

As can further be seen in FIG. 1B, the lid opening 124 also has a circular-symmetric shape. For example, this enables simple production of this opening 124 by a bore. An oval opening or a rectangular opening with strongly rounded corners, however, is also possible, in order to guarantee a seal around the entire circumference of the reception container, without damaging the protective film by sharp corners in the protective lid. Hereby, it can be ensured that part of the protective lid 118 is arranged on the film 112 directly via the edge 114 of the reception container 102 and thus, by the pressure between the protective lid 118 and the side edge 114 of the reception container 102, also a fluid-impermeable seal is optimized. As an alternative, however, only a ring, which takes over the function of the lug 122 illustrated in FIG. 1A, namely to cause sealing of the gel 108 against exterior influences like chemical attacks using the film 112 by the ring pressing the film into the groove 116, could also be used. In this case, however, the film 112 is exposed to mechanical and chemical influences or attacks in the entire area of the opening 110 of the reception container 102.

Figure 1C:
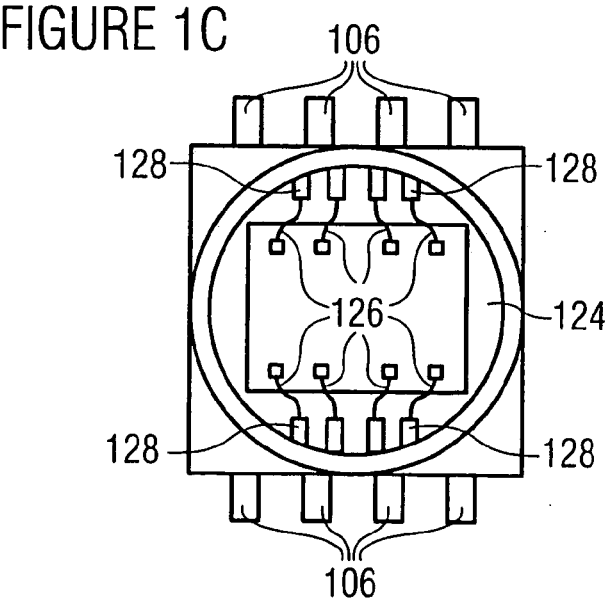
FIG. 1C is a plan view of the first embodiment of the present invention illustrated in FIG. 1A, wherein a partial area has been illustrated in enlarged manner.

FIG. 1C shows the plan view illustrated in FIG. 1B of the embodiment of the present invention illustrated in FIG. 1A, wherein now the film 112 and the gel 108 are either assumed to be transparent or are omitted for illustration reasons. In FIG. 1C, the area of the opening 124 is thus illustrated in enlarged manner and enables a top view onto the pressure sensor 104, which is arranged in the reception container 102, as well as its contacting with the contact pads 106. As can be seen from FIG. 1C, the pressure sensor 104 is connected via bond connections 126 to the contact pads 106 characterized by the illustrated contact pads 128 in the enlarged cutout of the opening 124. A connection between the contact pads 128 and the contact pads 106 is not shown in greater detail in FIG. 1C for illustration reasons. With reference to FIG. 1C, however, it should be noted that herein only a schematic illustration is to be seen, for the functionality of the inventive pressure sensor apparatus a gel 108 and a protective membrane (such as the exemplarily illustrated film 112) are to be used in any case.

FIG. 2 shows the steps of an embodiment of the inventive method of producing a pressure sensor apparatus. Here, in a first step, in a reception container 102, in which a pressure sensor 104 is arranged, a gel 108 is filled in via the opening 110 of the reception container 102. Herein, then a flexible film 112 is applied onto a surface of the gel, so that no air or gas inclusions between gel 108 and film 112 remain. This may for example take place when the reception container 102 is filled with gel 108 up to the edge of the opening 110. Alternatively, however, the film 112 may also be applied onto the gel 108 when the reception container 102 is not yet completely filled with gel 108. In this case, however, special attention should be paid to a fluid-impermeable seal between film 112 and reception container 102. Such a seal may then for example also be applied on an inside of the reception container 102, in which there is also the gel 108, on an edge 114, or an outside of the reception container 102. After applying the flexible film 112, the protective lid 118 illustrated in FIG. 1A may be clicked onto the gel-filled reception container 102 closed with the film 112 with the lug 122 and the opening 124, whereby a partial area of the film 112 is pressed in using the lug 122 and the groove 116 attached in the outside of the reception container 102, and thus a fluid-impermeable seal between the film 112 and the reception container 102 can be produced. In this manner, a pressure sensor apparatus employable in robust manner may be produced by steps very easy to execute in terms of production.

In summary, it can thus be stated that the problem of the protection of a pressure sensor from mechanical or chemical influence can be solved by the application of a chemically inert, flexible film 112 onto the gel surface. Here, special attention should be paid to an inexpensive method for sealing the film 112. In the present invention, for this, a special housing geometry is exemplarily proposed, which enables an inexpensively producible, fluid-impermeable seal. It is a housing with circular opening 124 and an outwardly circumscribing groove 116. After the assembly of the chip into the housing, the housing 102 is filled with gel 108. Then the film 112 is laid upon the opening 110.

For example, this is performed so that no air inclusion between film 112 and gel 108 remains. To this end, for example a convex-shaped stamping tool may be used, with which the film is at first fitted over the center of the gel surface. Then the film 112 is pressed toward the edge areas e.g. with compressed air coming out from nozzles in the stamp.

Last, a preferably punched lid 118 is clicked on, which for example has a circumscribing lug 122 on the inside, which exactly fits into the groove of the housing. The film 112 is clamped between the lug 122 and the groove 116, so that a fluid-tight connection develops, in which the flexible film 112 itself serves as sealing material.

As film material, preferably a chemically inert, gas, solvent, and ion-impermeable material is suited. The material should have good flow properties and act in self-sealing manner. Plastic films are possible, in particular. Possible film materials are PTFE (Teflon), polyethylene, or polypropylene. In principle, however, also metals are suited as film material.

In the case of a not self-sealing film 112, the film 112 may also be mounted by welding or applying glue.

The solution indicated is suitable for applications with pressures up to at least 10 bar.

Altogether, it should be noted that the invention thus provides a pressure sensor housing easy to produce in terms of fabrication with a pressure sensor lying therein, which allows good media separation and further prevents the formation of gel bubbles.

While this invention has been described in terms of several preferred embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations, and equivalents as fall within the true spirit and scope of the present invention.

What is claimed is:

1. A pressure sensor apparatus, comprising:
   a reception container for receiving a pressure sensor, the reception container comprising an opening on one side;
   a protective membrane closing the opening;
   a pressure sensor arranged in the reception container;
   a gel arranged in the reception container between the pressure sensor and the protective membrane; and
   a protective lid by means of which the protective membrane is at least partly covered, the protective lid being mounted to the reception container by means of a latch connection, and the latch connection including a groove and a lug, which can be latched in the groove, the groove being arranged either in the protective lid or the reception container and the lug being arranged in the other of the protective lid and the reception container, and the protective membrane being clamped at least partly between the groove and the lug.

2. A pressure sensor apparatus according to claim 1, wherein the protective membrane covers the gel in bubble-free manner.

3. A pressure sensor apparatus according to claim 1, wherein the protective membrane is fluid-impermeable.

4. A pressure sensor apparatus according to claim 1, wherein a connection between the protective membrane and the reception container is fluid-impermeable.

5. A pressure sensor apparatus according to claim 4, wherein the connection between the protective membrane and the reception container includes a glue connection.

6. A pressure sensor apparatus according to claim 1, wherein the protective membrane is ion-impermeable.

7. A pressure sensor apparatus according to claim 1, wherein the protective membrane is unstructured.

8. A pressure sensor apparatus according to claim 1, wherein the reception container includes plastic material.

9. A pressure sensor apparatus according to claim 1, wherein the gel is silicone gel.

10. A pressure sensor apparatus according to claim 1, wherein the protective membrane comprises plastic material.

11. A pressure sensor apparatus according to claim 1, wherein the protective membrane includes metal material.

12. A pressure sensor apparatus according to claim 1, further comprising a protective lid, through which the protective membrane is at least partly covered.

13. A pressure sensor apparatus according to claim 12, wherein the protective lid comprises a lid opening through which the protective membrane is at least partly exposed.

14. A pressure sensor apparatus according to claim 13, wherein the lid opening has a circle shape, an oval shape, or a rectangular shape.

15. A pressure sensor apparatus according to claim 14, wherein the protective membrane is clamped between the lug and the groove along a complete circumference, in order to serve as sealing means for the latch connection, whereby the same is fluid-impermeable.

16. A pressure sensor apparatus according to claim 12, wherein the reception container and the protective lid have a cylindrical shape.

17. A pressure sensor apparatus according to claim 1, wherein a connection between the protective membrane and the reception container includes a weld connection.

18. A method of producing a pressure sensor apparatus, comprising the steps of:
providing a reception container and a pressure sensor arranged in the reception container, the reception container having an opening;
filling in gel into the reception container; and applying a protective membrane onto a surface of the gel in the area of the opening of the reception container in order to close the opening of the reception container, such that the gel is arranged between the protective membrane and the pressure sensor; and
arranging a protective lid by means of which the protective membrane is at least partly covered, the protective lid being mounted to the reception container by means of a latch connection, and the latch connection including a groove and a lug, which can be latched in the groove, the groove being arranged either in the protective lid or the reception container and the lug being arranged in the other of the protective lid and the reception container, and the protective membrane being clamped at least partly between the groove and the lug.

19. A method of producing a pressure sensor apparatus according to claim 18, further comprising the step of:
connecting the protective membrane to the reception container, such that a connection between the reception container and the protective membrane is fluid-impermeable.

20. A method of producing a pressure sensor apparatus according to claim 19, wherein connecting the protective membrane to the reception container takes place by welding the protective membrane to the reception container.

21. A method of producing a pressure sensor apparatus according to claim 19, wherein connecting the protective membrane to the reception container includes gluing the protective membrane to the reception container.

22. A method of producing a pressure sensor apparatus according to claim 18, wherein applying the protective membrane is performed such that the protective membrane covers the surface of the gel in bubble-free manner.

23. A method of producing a pressure sensor apparatus according to claim 18, wherein the step of applying is performed after the step of filling in.

24. A method of producing a pressure sensor apparatus according to claim 18, wherein the step of applying comprises the steps of:
arranging the protective membrane above the opening of the reception container;
centrally fitting the protective membrane onto the surface of the gel using a convex-shaped stamping tool; and
completely pressing the protective membrane to the surface of the gel up to an edge of the opening of the reception container.

* * * * *